US008768785B2

(12) United States Patent
Buchheit

(10) Patent No.: US 8,768,785 B2
(45) Date of Patent: Jul. 1, 2014

(54) AUTOMATED COMPATIBILITY CHECKING FOR HARDWARE/SOFTWARE PURCHASES AT TIME OF PURCHASE

(76) Inventor: Brian K. Buchheit, Davie, FL (US)

(*) Notice: Subject to any disclaimer, the term of this patent is extended or adjusted under 35 U.S.C. 154(b) by 1851 days.

(21) Appl. No.: 11/684,716

(22) Filed: Mar. 12, 2007

(65) Prior Publication Data

US 2008/0228503 A1   Sep. 18, 2008

(51) Int. Cl.
*G06Q 30/00* (2012.01)
*G06Q 10/00* (2012.01)

(52) U.S. Cl.
USPC .......... 705/26.5; 705/26.7; 705/304; 705/340

(58) Field of Classification Search
USPC ........................................................ 705/1, 26
See application file for complete search history.

(56) References Cited

U.S. PATENT DOCUMENTS

| | | | | | |
|---|---|---|---|---|---|
| 5,859,969 | A | * | 1/1999 | Oki et al. ....................... | 709/200 |
| 5,963,939 | A | * | 10/1999 | McCann et al. ................ | 1/1 |
| 5,987,473 | A | * | 11/1999 | Jorgensen ...................... | 1/1 |
| 6,055,513 | A | * | 4/2000 | Katz et al. ..................... | 705/26 |
| 6,167,383 | A | * | 12/2000 | Henson .......................... | 705/26 |
| 6,226,656 | B1 | * | 5/2001 | Zawadzki et al. ............. | 715/235 |
| 6,526,387 | B1 | * | 2/2003 | Ruffin et al. .................. | 705/7.29 |
| 6,735,625 | B1 | * | 5/2004 | Ponna ........................... | 709/223 |
| 7,647,254 | B2 | * | 1/2010 | Cool .............................. | 705/26.5 |
| 7,783,528 | B2 | * | 8/2010 | Musgrove et al. ............ | 705/26.1 |
| 7,885,820 | B1 | * | 2/2011 | Mancisidor et al. .......... | 705/1.1 |
| 2007/0180052 | A1 | * | 8/2007 | Zomaya ........................ | 709/217 |
| 2008/0059782 | A1 | * | 3/2008 | Kruse et al. ................... | 713/1 |

OTHER PUBLICATIONS

Todd G. Tatnall, Updating Your Updates, Mar. 2006, EQ, Issue 3, p. 10.*
Intel® vPRO™ Technology Previewing for the First Time in Cairo. Oct. 4, 2006, Middle East Company News, p. 1.*

* cited by examiner

*Primary Examiner* — Gerardo Araque, Jr.
(74) *Attorney, Agent, or Firm* — Patents on Demand P.A.; Brian K. Buchheit; Scott M. Garrett

(57) ABSTRACT

The present invention can include a pre-purchase method for determining computing item compatibility. In the method, configuration information associated with a computing system can be stored. A for-sale item to be used with the computing system can be detected. A compatibility between the for-sale item and the configuration information can be determined. A potential purchaser can be notified of results of the determining step before completing a purchase of the for-sale item. The method can be automatically performed by an online storefront system (e.g., a e-retailing Web site) or by in-store computing equipment, such as a cashier's register and/or an in-store kiosk.

18 Claims, 4 Drawing Sheets

| Compatibility Report 300 | | | 320 — Total Conflicts: 2 |
|---|---|---|---|
| System 310 | Conflict 312 | Item 314 | Substitute Item 316 |
| - Home #1 | | | |
| • Drivers | None | ............ | Not Applicable |
| Video Card | None | ............ | Not Applicable |
| Sound Card | None | ............ | 322 — Not Applicable |
| Memory | YES  Details: ECC memory required for this motherboard. | MEMORY AAAA | MEMORY BBBB |
| + Home #2 | YES  Summary: Video Card Conflict  Details: Card is AGP, Motherboard requires PCI-X  324 | Multiple – Conflicts  VIDEO AAAA | VIDEO BBBB  VIDEO CCCC |
| + Mobile | None | ............ | Not Applicable |
| - Business #1 | None | ............ | Not Applicable |
| • Drivers | None | ............ | Not Applicable |
| Video Card | None | ............ | Not Applicable |
| Sound Card | None | ............ | Not Applicable |
| RAID | None | ............ | Not Applicable |

340 — [ Print ]   [ Email ] — 342

FIG. 3

AUTOMATED COMPATIBILITY CHECKING FOR HARDWARE/SOFTWARE PURCHASES AT TIME OF PURCHASE

BACKGROUND

1. Field of the Invention

The present invention relates to the field of commerce and more particularly, to a technique of automated compatibility checking for hardware and/or software purchases at the time of purchase.

2. Description of the Related Art

Many different hardware and software platforms exist, each having specific compatibility requirements. In many instances, individuals purchase hardware and/or software that are incompatible with an existing system for which the purchased hardware/software is intended. Requirements of new hardware and software are becoming more selective forcing consumers to be intimately aware of their systems, which is not always the case. Even the most knowledgeable of consumers can be unhappily surprised by non-advertised system/platform specific requirements. For example, many hardware devices and/or software applications that operate perfectly under the WINDOWS XP 32-bit platform are inoperable under the WINDOWS XP 64-bit platform, due mainly to a scarcity of platform specific 64-bit drivers. By comparison there are a wealth of 32-bit drivers which cannot be used for the 64-bit platform.

Many times, consumers purchase items only to discover later that these items do not operate with their existing system. Having purchased an item that is not compatible with their system, the consumer will attempt to return the item to the retailer which requires the consumer to go through the retailer's item return procedures. Some retailers do not permit software/hardware computing components to be returned at all. Other retailers charge a significant restocking fee (e.g., fifteen percent or more). On the retailer side of an incompatible purchase, retailers are forced to sell returned items as open box items which can cost the retailer money. Essentially, hardware/software incompatibilities currently cost both the consumer and the retailer time and money.

This situation results in a negative impact to consumers and to retailers, who often receive unhappy customer complaints about purchased hardware and/or software. Software returns can be particularly problematic due to network activation codes, as a new purchaser may have problems re-activating a previously activated software product. This may in turn create a cycle where all parties involved have lost resources through these activities, even though all involved parties have acted in good faith.

SUMMARY OF THE INVENTION

The present invention discloses a system and a method for automatically checking hardware/software compatibility between a desired for-sale item and a customer's target computing system at the time of purchase. More specifically, a network element can store system information for one or more consumer specific computing systems. A compatibility checking service can access the system information of the network storage element in the context of a desired for-sale item. The checking service can be integrated with a point-of-sale system. When the desired for-sale item is compatible with a target system, the purchase can be completed without intervention. Alternatively, a compatibility verification notification can be presented to the consumer when an incompatibility is detected, resulting in the purchase of the desired for-sale item being interrupted and a notice of the potential incompatibility being provided. The consumer can then consciously elect whether they wish to continue the purchase despite the potential incompatibility; whether they wish to negate the purchase attempt; or, whether they wish to purchase a similar, yet compatible for-sale item from the retailer. In various embodiments, a compatibility checking service can be integrated with in-store checkout counters, with e-commerce stores, with compatibility kiosks, and/or with a mobile computing device (e.g., mobile telephone or network enabled PDA), each of which can be designed to inform a purchaser of a potential conflict before a purchase is completed.

A number of different techniques can be used to populate the network storage element with system configuration information. In one arrangement, a client-side software agent can interact with the network storage element, where the client-side software agent can use automated registry scans to determine configuration specifics. In another arrangement, a computer administrator can be prompted to complete a Web based form that requires a system's specifics. In still another arrangement, the network storage element can be communicatively linked to one or more retailers which provide computing system information relating to a customer. For example, when a computer system upgrade is performed by a retailer (e.g., BEST BUY), system and upgrade specifics can be automatically conveyed to the network storage element.

The present invention can be implemented in accordance with numerous aspects consistent with material presented herein. For example, one aspect of the present invention can include a pre-purchase method for determining computing item compatibility. In the method, configuration information associated with a computing system can be stored. A for-sale item to be used with the computer system can be detected. A compatibility between the for-sale item and the configuration information can be determined. A potential purchaser can be notified of results of the determining step before completing a purchase of the desired for-sale item. The method can be automatically performed by an online storefront system (e.g., an e-retailing Web site) or by in-store computing equipment, such as a cashier's register and/or an in-store kiosk.

Another aspect of the present invention can include a computing interface that includes a target system section, a computing item section, and a compatibility checking element. The target system section can permit a user of a computing interface to identify a computing system. Configuration information for the identified computing system can be previously stored in data store communicatively linked to the computing interface. The computing item section can permit the user to identify one or more computing items to be used with the identified computing system. The compatibility checking element can execute a compatibility software program. The compatibility software program can contain a set of programmatic instruction readable by a machine causing the machine to determine a compatibility between the desired computing item identified in the computing item section and the identified computing system.

Still another aspect of the present invention can include a system for determining computing item compatibility. The system can include a configuration data store, a platform compatibility engine, and a storefront system. The configuration data store can store configuration information associated with one or more computing systems. The platform compatibility engine can determine whether a for-sale computing item is compatible with a target computing system based upon configuration information associated with the target computing system, which is stored in the configuration data store. The storefront system can be remotely located from the configuration data store and can permit a potential purchaser to purchase a for-sale item. Before the storefront system completes a purchase involving the for-sale item, one of the computing systems associated with the potential purchaser can be identified and the platform compatibility engine can be used to determine if the for-sale item, which is a computing item, is compatible with the identified computing system.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 is a sample compatibility report generated at approximately a time of sale, which indicates whether items to be purchased are compatible with target systems in accordance with an embodiment of the inventive arrangements disclosed herein.

DETAILED DESCRIPTION OF THE INVENTION

Figure 1:
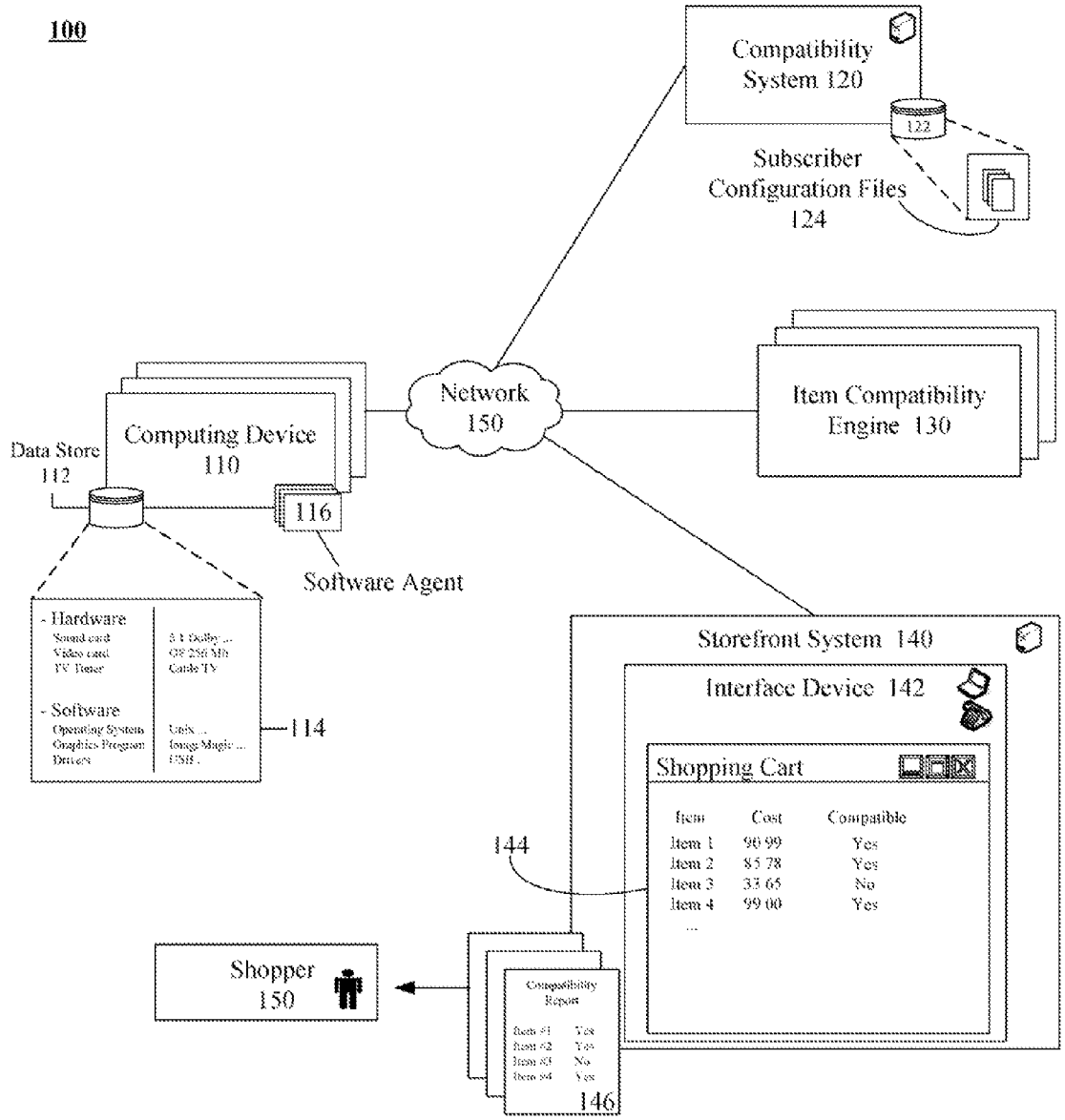
FIG. 1 is a schematic diagram of an automated compatibility checking system for determining a compatibility of hardware/software items with a target computing system before a purchase of the items is completed in accordance with an embodiment of the inventive arrangements disclosed herein.

FIG. 1 is a schematic diagram of an automated compatibility checking system 100 for determining a compatibility of hardware/software items with a target computing system before a purchase of the items is completed in accordance with an embodiment of the inventive arrangements disclosed herein. More specifically, system 100 shows that before a purchase is finalized, a for-sale computing item (e.g., software, peripheral, expansion card, memory, and other device) is compatible with a target system. In one embodiment, the compatibility check can be automatically performed by a storefront system 140 as part of the purchasing process.

Turning to system 100 details, a computing device 110, a compatibility system 120, an item compatibility engine 130, and a storefront system 140 can each be communicatively linked to a network 150. The computing device 110 can be a target computing device for which a for-sale computing item purchased through the storefront system 140 is to be used. A data store 112 of the computing device 110 can specify hardware and software details of the device 110. For example, in a WINDOWS based system, system details are centrally managed by a REGISTRY. Other platforms (e.g., a LINUX based platform or a MACINTOSH based one) have similar hardware/software management components, each of which store system specifics in a memory, as illustrated by data store 112. In one contemplated arrangement, a software agent 116 can also execute upon the computing device 110 to automatically determine hardware/software of the device 110.

Regardless of how specifics for a computing device 110 are determined, these specifics can be conveyed to the compatibility system 120, which creates a subscriber configuration file 124 for the device 110. The compatibility system 120 can store and manage configuration information for multiple different devices 110 for a single subscriber or for multiple different subscribers. For example, a configuration file 124 stored in data store 122 can be related to a subscriber's home computer system (device 110). In another example, compatibility system 120 can maintain configuration files 124 for a set of computing devices 110 used by a business entity and/or managed by a specific administrator.

At a time of purchase, the compatibility system 120 can interface with a storefront system 140. For example, when a shopper 150, who can be the owner or administrator of computing device 110, adds for-sale computing items to a shopping cart 144, a compatibility report 146 for these for-sale computing items can be presented to the shopper 150. The compatibility report 150 can indicate whether each item to be purchased is compatible with a computing device 110 associated with or specified by the shopper 150.

For instance, a target system for the items to be purchased can be input into interface device 142. The shopping system 140 can convey an indicator of the target system and details of each of the for-sale items to the compatibility system 120, which references an appropriate configuration file 124 associated with the target system. An item compatibility engine 130 can determine if each item is compatible with the target system based upon details specified within the configuration file 124. For example, the engine 130 can determine if suitable hardware interfaces exist for attaching the item, can determine if minimum system requirements of the item are satisfied, and can query historical data stores to determine if known problems exists that would negatively affect the use of a computing item within the target system. The engine 130 can be a component of system 120 and/or system 140. The engine 130 can also be a processing engine of a remotely located but communicatively linked computing system. In one contemplated embodiment, a compatibility service (e.g., a Web service) can be provided by the compatibility system 120 for the storefront system 140 for a fee, which is paid by either the shopper 150 and/or the storefront entity.

As used herein, the computing device 110 can be any computing device for which a configuration file 124 can be generated. The computing device 110 can include a stand-alone computing system, a thin client, a component of a larger computing system, and/or a peripheral device. The peripheral device (e.g., a copier within peripheral specific memory, interface cards, and the like) can have upgradeable hardware/firmware/software components. The computing device 110 can include, but is not limited to a computer, a server, a personal data assistant (PDA), a mobile phone, a wearable computer, an embedded computing system, a media player, a network-enabled consumer electronic device, an entertainment system, a network attached storage (NAS) device, and the like.

A for-sale item can be any item made to interoperate or to be installed within the computing device 110. The for-sale item can include hardware and software. When the for-sale item is associated with a desktop computer (device 110), the for-sale item can include, but is not limited to, RAM, an expansion card, a hard drive, a media drive, a CPU, a peripheral (USB, SATA, PATA, FIREWIRE, and the like), a software application, a software extension or upgrade to a pre-existing application, and the like. A for-sale item can have platform compatibility concerns, hardware interface concerns, software driver concerns, minimum hardware/software requirements, network interface compatibility issues, and the like. The compatibility system 120 can handle each of these compatibility concerns or a configurable subset of the compatibility concerns. Further, in one embodiment, the compatibility system 120 can consider other for-sale items in the shopping cart 144 when generating the compatibility report 146. For example, if a VISTA operating system is included in the shopping cart 144 along with a new video card, the compatibility report 146 can indicate whether a system upgraded with the new video card meets the video requirements for the purchased version of VISTA. The report 146 can further specify whether the video card meets video requirements of upgraded variants of the purchased VISTA software.

The storefront system 140 can be any system capable of communicating with compatibility system 120 that is able to identify shopper 150 specified for-sale items to be purchased. The storefront system 140 can include a server of an e-commerce site, a register used by a cashier within a store, a mobile device (e.g., a smart phone or PDA) carried by shopper 150 within a store, and/or an in-store kiosk. For example, the storefront system 150 can be a check-out system that automatically generates a compatibility report 146 as part of a check-out process. In another example, the user may need to specify a contemplated for-sale item to an interface device 142 not directly linked to a check-out process before the check-out process begins (i.e., by scanning a bar code for the item into a kiosk or entering the item into a network enabled mobile device). The interface device 142 can generate report 146 after exchanging data with the compatibility system 120 and receiving a response from this system 120.

Network 150 can be used to communicatively link different components of system 100 to one another. Network 150 can include any hardware/software/and firmware necessary to convey data encoded within carrier waves. Network 150 can include one or more personal area network (PAN), local area network (LAN), metropolitan area network (MAN), wide area network (WAN), virtual private network (VPN), and the like. Network 150 can also include local components and data pathways necessary for communications to be exchanged among computing device components and between integrated device components and peripheral devices. The network 150 can include line based and/or wireless communication pathways.

Data stores 112 and 122 can be physically implemented within any type of hardware including, but not limited to, a magnetic disk, an optical disk, a semiconductor memory, a digitally encoded plastic memory, a holographic memory, or any other recording medium. Each of the data stores 112 and 122 can be stand-alone storage units as well as a storage unit formed from a plurality of physical devices, which may be remotely located from one another. Additionally, information can be stored within each data store 112 and 122 in a variety of manners. For example, information can be stored within a database structure or can be stored within one or more files of a file storage system, where each file may or may not be indexed for information searching purposes.

Figure 2:
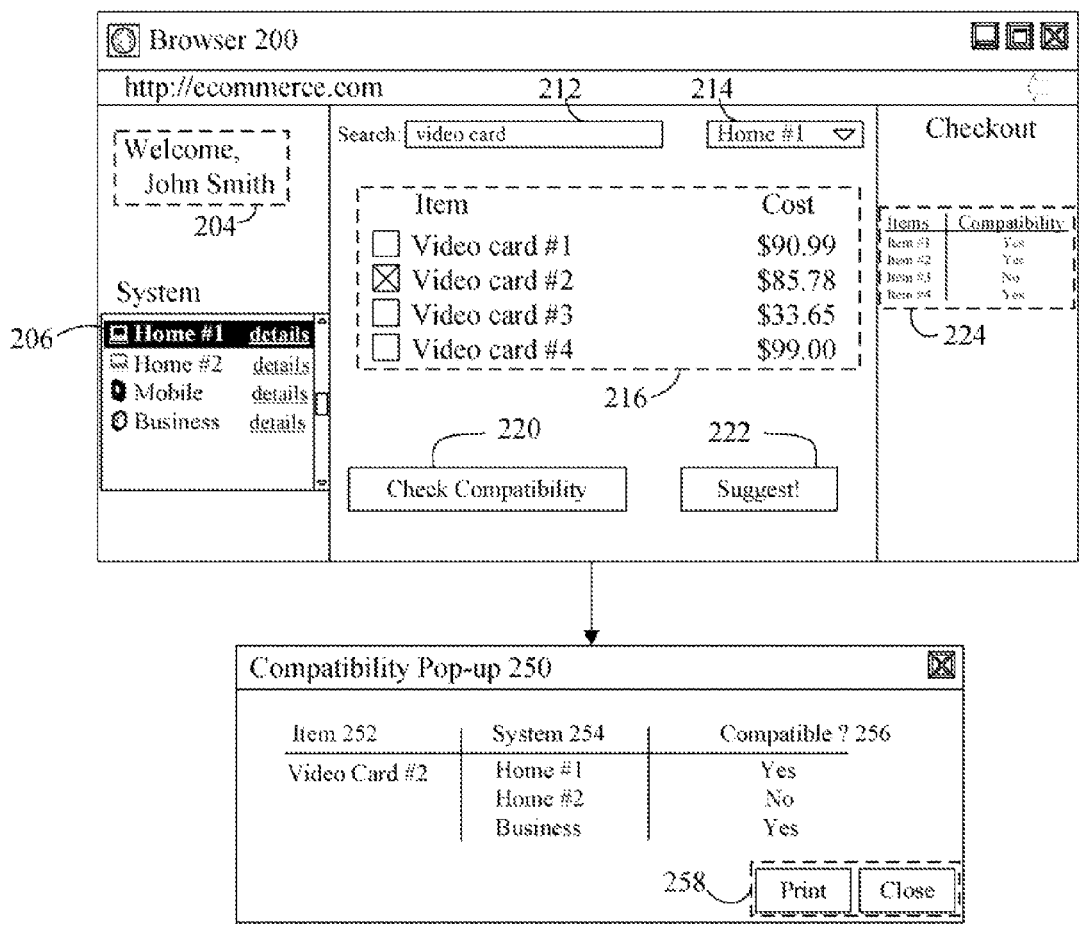
FIG. 2 is a schematic diagram of successive GUIs that illustrate interfaces designed to check compatibility of items to be purchased against a target system before items purchases are finalized in accordance with an embodiment of the inventive arrangements disclosed herein.

FIG. 2 is a schematic diagram of successive GUIs that illustrate interfaces designed to check compatibility of for-sale items to be purchased against a target system before purchases are finalized in accordance with an embodiment of the inventive arrangements disclosed herein. The GUIs can be those of interface device 142 in one contemplated embodiment. As shown, the GUIs include a GUI of a browser 200 and a compatibility pop-up 250 interface.

Browser 200 can be used to display an e-commerce interface where an identified user 204 can select items to purchase. Additionally, the user 204 can select a target system 206 to which a desired for-sale item is to be utilized. The systems 206 can be computing devices for which configuration information is maintained by a compatibility system, such as one having a configuration file 124 as shown in system 100.

In one embodiment, a target system 214 element can be used to limit items presented in the ecommerce site to only those items which are compatible with the selected system. For example, the items in section 216 can include only those video cards (based upon a limitation input into search box 212) that are compatible with a system designated as Home #1.

When presented items are not limited to those compatible with a particular system (i.e., no limiting system is selected in element 214 or the interface lacks such an element 214) a button 220 or user selectable option can be used to check a compatibility of a selected for-sale item (e.g., Video card #2 selected by checking the check box.) against a system selected in the target system 206 section (e.g., a highlighted system, such as Home #1.) Selecting button 220 can result in pop-up 250 being displayed. The pop-up 250 can present a compatibility report, such as report 146 of system 100.

In one embodiment, the pop-up 250 can present a table showing selected items 252, one or more target systems 254, and whether the for-sale item is compatible 256 with that system. Details (not shown) about incompatibilities can also be displayed. Although compatibility 256 is shown as a binary element, compatibility can instead be expressed as a range. For example, a particular video card can be ninety percent compatible with one target system and eighty percent compatible with another system. The pop-up 250 can have configurable parameters, which permits a user to limit compatibility assessments to user specified criteria (e.g., hardware compatibility only, interface compatibility, platform compatibility, and the like). Pop-up 250 can include a number of options 258, such as printing a report, closing the pop-up, emailing a report (not shown), displaying an advanced report (not shown), and the like. In one arrangement, rather than displaying compatibility information in a pop-up 250, this information can be automatically and dynamically displayed 224 next to shopping cart items appearing in a checkout section of the ecommerce site.

Another useful compatibility related option can include a suggestion 222 option. The suggestion option can display one or more suggested items, which are compatible with a target system. For example, if a user selected video card is not compatible with a target system, the suggest 222 option automatically display a set of alternative video cards, similar to the selected one, yet which are compatible with the target system.

It should be appreciated that the GUIs of FIG. 2 are provided for illustrative purposes only and that the invention can be implemented in any of variety of ways other than those illustrated. Use of alternative and derivative display elements, input field types, menus, tabs, window, and the like are contemplated herein. Additionally, although a graphical interface is shown, the concepts expressed by the GUIs can be implemented within an interactive speech interface, a multimodal interface, a three-dimensional interface, and the like, by one of ordinary skill in the art without undue experimentation using techniques known in the art.

FIG. 3 is a sample compatibility report 300 generated at approximately a time of sale, which indicates whether for-sale items to be purchased are compatible with target systems in accordance with an embodiment of the inventive arrangements disclosed herein. The report 300 can represent one contemplated report 146 presented to shopper 150 of system 100.

Compatibility report 300 can be displayed on, but not limited to a kiosk, a mobile phone, a PDA, or other computing device. The report 300 can also be a printed report. Further, the report can be directly displayed to a shopper or displayed to a storefront agent, who communicates the report information to the shopper. Appreciably, the details shown in report 300 are for illustrative purposes only and the invention is not to be construed as limited in this regard.

The compatibility report 300 can present a complete list of computing systems, purchaser selected items, potential conflicts and substitute items. As shown the report can indicate a total number of conflicts 320 for analyzed items. In one arrangement, the report 300 can include a table having columns of system 310, conflict 312, item 314, and substitute item 316. Each system 310 can include hieratical elements, which are decomposable into component parts. For example, a system identified as Home #1 can include component elements of drivers, video card, sound card, memory, and the like.

When a component, such as memory, is identified as causing a conflict 312 or an incompatibility, additional information 322 can be presented. Similarly, when a non-decomposed system, such as a system identified as Home #2 includes one or more potential conflicts 312, an overview of the conflicts can be displayed 324. The displays 322 and 324 can indicate which item(s) 314 is conflicting and can offer substitute items 316 that would not have a conflict. For example, the item 314 or display 322 is MEMORY AAAA, which is non-ECC memory even though ECC memory is required for a motherboard of Home #1. A substitute item 316 (e.g., MEMORY BBBB) can be an ECC memory approximately equivalent to MEMORY AAAA.

The compatibility report 300 can include a number of options, such as printing a report 340, emailing a report 342, displaying an advanced report (not shown), and the like.

Figure 4:
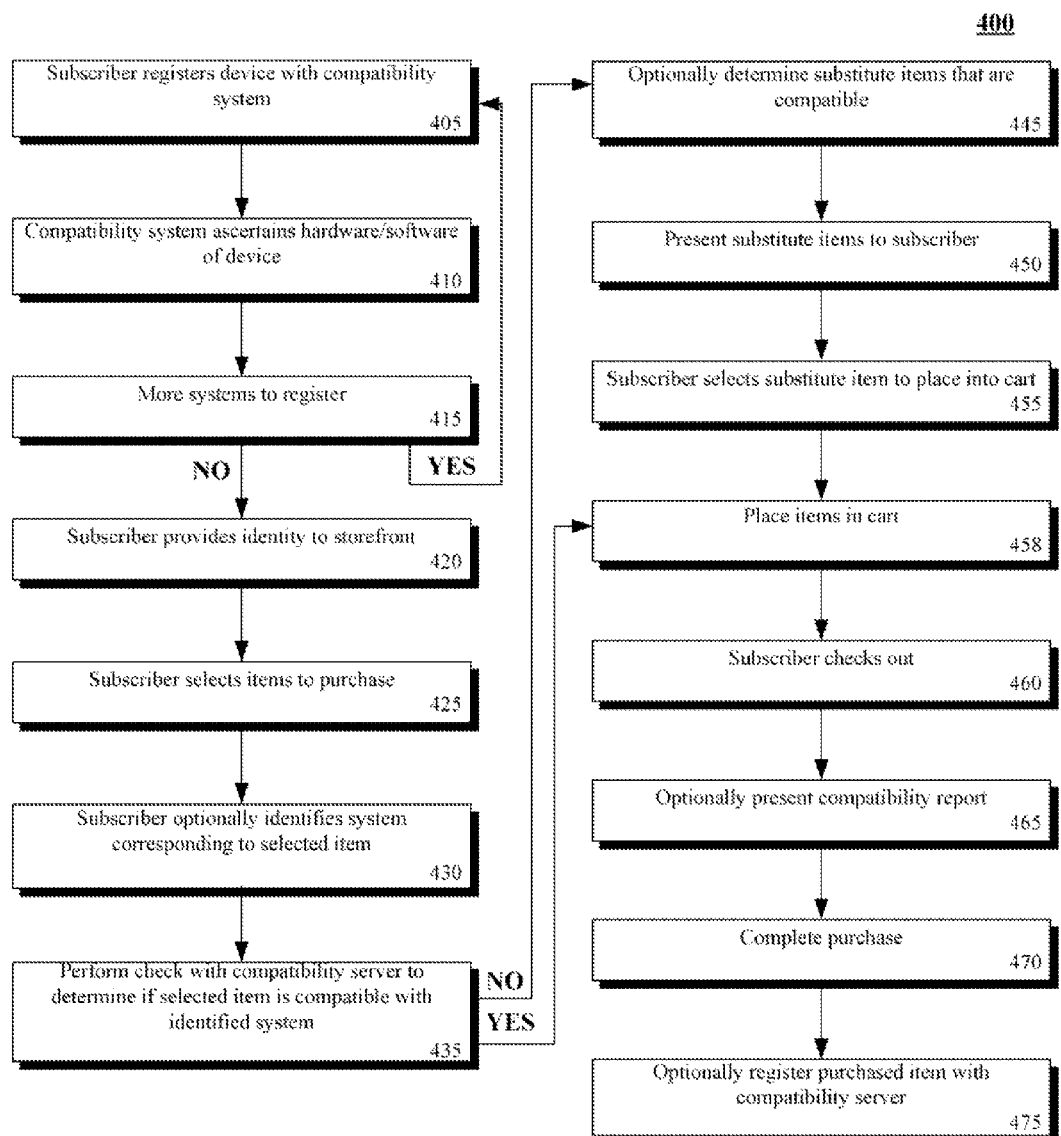
FIG. 4 is a flow chart diagram of a method for the automated compatibility checking system for determining the compatibility of hardware/software purchases at time of purchase in accordance with an embodiment of inventive arrangements.

FIG. 4 is a flow chart diagram of a method 400 for the automated compatibility checking system for determining the compatibility of hardware/software purchases at time of purchase in accordance with an embodiment of inventive arrangements. The method 400 can be performed in a context of system 100 or an equivalent system.

Method 400 can begin in step 405, where a subscriber registers a device with the compatibility system. In step 410, the compatibility system can ascertain the hardware/software of the device. For example, a subscriber can be repetitively prompted for information regarding the system and/or a software agent can execute upon a target device to determine device configuration information. In step 415, a determination can be made regarding whether additional configuration information is to be provided for other systems. If so, the method can loop from step 415 to step 405. Otherwise, the method can proceed from step 415 to step 420.

That is, when all the desired systems have been registered, the subscriber can provide their identity to the storefront, as shown in step 420. For example, if the storefront is an e-commerce site, the subscriber can login using a user identifier. If the storefront is a physical store, the subscriber can provide a rewards card, an identifying phone number, or other such information. In step 425, the identified subscriber can select one or more for-sale items to purchase. In step 430, the subscriber can optionally identify a target system for each of the selected items.

In step 435, a compatibility check can be performed to determine if the selected items are compatible with the target systems. Upon determination that the selected items are compatible, the method can proceed to step 458 and complete the purchase of the items.

When an item is determined to be not compatible, the method can proceed to step 445, where one or more substitute items for the incompatible one can be optionally determined. The substitute items can be presented to the subscriber in step 450, which permits the subscriber to select a substitute item (step 455), to ignore the compatibility warning (not shown), or to take another informed action. Compatible items and/or user approved items can be placed in a shopping card, as shown by step 458. In step 460, a subscriber can check-out, which completes a purchase of the computing items. In optional step 465 a compatibility report can be presented to the user and/or can be stored by the storefront. A storefront can elect to refuse attempts to return items that are identified as incompatible in the report. The storefront can also charge a return penalty for known incompatible item returns compared to other items listed as compatible.

In step 470, a purchase of the items can complete. The purchase can be optionally registered with the compatibility server in step 475. Registering the purchase can cause purchased items to be added to the target systems. For example, a purchase of a video card for a target system can cause the compatibility server to update system information of the target system to reflect the newly purchased video card. In another embodiment, the purchase can trigger the compatibility server to scan the target systems for upgrades after a suitable delay time (e.g., a time sufficient for the purchased item to be installed in the target system).

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A pre-purchase method for determining computing item compatibility comprising:
   storing, by one or more computing devices each comprising computing equipment having at least one processor executing instructions stored in a non-transitory medium, configuration information associated with a previously purchased home computer of a potential purchaser;
   detecting, by at least one of the one or more computing devices, a for-sale item to be used with the previously purchased home computer, wherein the for-sale item is a computer peripheral hardware component;
   determining, by at least one of the one or more computing devices wherein the at least one of the computing devices is a storefront system, wherein the determining occurs as part of a purchasing process, a compatibility between the for-sale item and the configuration information, wherein said determining step further comprises:
      checking to ensure that software drivers exist for a platform defined by the configuration information that enable the computer peripheral hardware component to operate and be installed within the previously purchased home computer to which the configuration information applies; and
      checking a hardware interface of the computer peripheral hardware component against at least one hardware interface of the previously purchased home computer;
   responsive to determining that the computer peripheral hardware component is compatible with the previously purchased home computer, the storefront system completing a purchase of the for-sale item without presenting a compatibility warning to the potential purchaser;
   responsive to determining that the computer peripheral hardware component is not compatible with the previously purchased home computer, the storefront system interrupting the purchase of the for-sale item, and presenting the potential purchaser with the compatibility warning indicating that results of the determining step indicate the for-sale item is not compatible with the previously purchased home computer, wherein the compatibility warning is presented only when the determining indicates incompatibility and occurs before the potential purchaser completes the purchase of the for-sale item;
   permitting, by the storefront system, the potential purchaser to ignore the compatibility warning, while recording that the compatibility warning was presented;
   upon an attempt by the potential purchaser to return the for-sale item after the purchase, the storefront system:
      refusing the attempt to return the for-sale item that was identified by the storefront system as being incompatible with the previously purchase home computer before the purchase was completed; or
      charging a return penalty to the potential purchaser for return of the for-sale item that had a known incompatibility.

2. The method of claim 1, further comprising:
   the storefront system registering the for-sale item thereby updating the stored configuration information of the previously purchased home computer to include the for-sale item.

3. The method of claim 1, wherein the storing, detecting, and determining steps are steps performed as part of a computing compatibility Web service provided by a compatibility system comprising at least one of the computing devices for a fee, which is paid by either the potential purchaser or by an entity providing a storefront that includes the storefront system.

4. The method of claim 1, wherein said previously purchased home computer is one of a plurality of computing systems owned by the potential purchaser, wherein said storing step stores configuration information associated with each of the plurality of computing systems, and wherein said determining step determines a compatibility between the for-sale item and the configuration information for each of the plurality of computing systems.

5. The method of claim 1, further comprising:
   the potential purchaser, by at least one of the one or more computing devices, selecting the for-sale item via an e-commerce Web site, wherein the presenting of the compatibility warning is through the e-commerce Web site.

6. The method of claim 1, further comprising:
   the potential purchaser providing the for-sale item to a human cashier, who utilizes the storefront system during the purchasing process.

7. The method of claim 1, further comprising:
   identifying a kiosk in a store, said kiosk performing the detecting, determining, and presenting steps.

8. The method of claim 1, wherein the for-sale item is a software application.

9. The method of claim 1, said presenting of the compatibility warning further comprising:
   expressing by the storefront system within the compatibility warning a range of compatibility, wherein the range indicates a percentage that the for-sale item is compatible with the previously purchased home computer.

10. The method of claim 1, further comprising:
    responsive to determining that the computer peripheral hardware component is not compatible with the previously purchased home computer, the storefront system determining a set of one or more substitute items for the for-sale item that is compatible with the previously purchased home computer; and
    the storefront system presenting the determined set of one or more substitute items to the potential purchaser when the compatibility warning is presented.

11. A computer program product comprising:
    a program for controlling computer equipment, said program being stored in a non-transitory medium, said program when executed by the computing equipment generating a computer interface that is a graphical user interface through which a user interacts with the computing equipment, said computer interface comprising:
    a target system section configured to permit a user of a computer interface to identify one or more computers, wherein configuration information for the identified one or more computers is previously stored in data store communicatively linked to the computer interface;
    a computing item section configured to permit the user to identify at least one for-sale item to be used with the identified one or more computers;

a compatibility checking element configured to execute a compatibility software program, wherein the compatibility software program contains a set of programmatic instructions readable by a machine causing the machine to determine a compatibility between said at least one for-sale item identified in the computing item section and the identified one or more computers, wherein said at least one for-sale item is a hardware component installable on at least one of the one or more computers or is a software program for installation and execution on at least one of the one or more computers;

a notification section configured to present results of the compatibility software program, said results including an indication of whether the at least one for-sale item is compatible with the identified one or more computers;

permitting the potential purchaser to ignore the indication, while recording that the indication was presented;

upon an attempt by the potential purchaser to return the for-sale item after the purchase:
- refusing the attempt to return the for-sale item that was identified as being incompatible with the previously purchase home computer before the purchase was completed; or
- charging a return penalty to the potential purchaser for return of the for-sale item that had a known incompatibility.

12. The computer program product of claim 11, wherein said computing interface further comprises:
a target system element configured to limit items presenting the computer item section to those items which are compatible with a selected computer identified by the target system section, wherein non-compatible items are excluded from the target system element.

13. The computer program product of claim 12, wherein said Web site is an e-commerce Web site.

14. The computer program product of claim 11, wherein the computing interface is a graphical user interface of a storefront check-out system.

15. A system for determining computing item compatibility:
at least one software agent, comprising program instructions stored in a memory, said program instructions executing on a processor to automatically determine configuration information for a computer upon which the software agent executes, wherein the configuration data is stored in a configuration data store;
a configuration data store for storing configuration information of the computer;
a platform compatibility engine configured to determine whether a for-sale item being sold by a retailer is compatible with the computer based upon the stored configuration information;
a storefront system remotely located from the configuration data store configured to permit a potential purchaser to purchase the for-sale item, wherein before the storefront system completes a purchase involving the for-sale item for a purchaser, the storefront system triggers the platform compatibility engine to query the configuration data store for the compatibility information of the computer and to determine whether the for-sale item is compatible with the computer or not, wherein the storefront system interrupts the purchase of the for-sale item only when the for-sale item is determined to be incompatible with the computer, wherein said for-sale item is a hardware component installable on the computer or is a software program for installation and execution on the identified computing system;
permitting, by the storefront system, the potential purchaser to ignore the interruption, while recording that the interruption was presented;
upon an attempt by the potential purchaser to return the for-sale item after the purchase, the storefront system:
- refusing the attempt to return the for-sale item that was identified by the storefront system as being incompatible with the previously purchase home computer before the purchase was completed; or
- charging a return penalty to the potential purchaser for return of the for-sale item that had a known incompatibility.

16. The system of claim 15, wherein the storefront system communicates across a network with the computer during the sale of the for-sale item.

17. The system of claim 15, wherein the storefront system is an e-commerce system.

18. A method comprising:
running a software agent program on a computer to generate configuration information for that computer, said configuration information defining hardware and software of the computer;
storing within a non-transitory storage medium the configuration information associated with a desktop computer;
a software program running on a mobile phone carried by a shopper detecting a for-sale item to be installed on the computer;
the software program of the mobile phone determining a compatibility or non-compatibility between the for-sale item and the configuration information of the computer;
the software program of the mobile phone presenting a compatibility report on the mobile phone indicating an extent that the for-sale item is compatible with the computer given the configuration information of the computer;
the software program permitting the potential purchaser to ignore the compatibility report, while recording that the compatibility report was presented;
upon an attempt by the potential purchaser to return the for-sale item after the purchase:
- refusing the attempt to return the for-sale item that was identified as being incompatible with the previously purchase home computer before the purchase was completed; or
- charging a return penalty to the potential purchaser for return of the for-sale item that had a known incompatibility.

* * * * *